April 19, 1927.
W. WRIGHT
CAR ROOF
Filed April 26, 1924    5 Sheets-Sheet 1
1,625,636
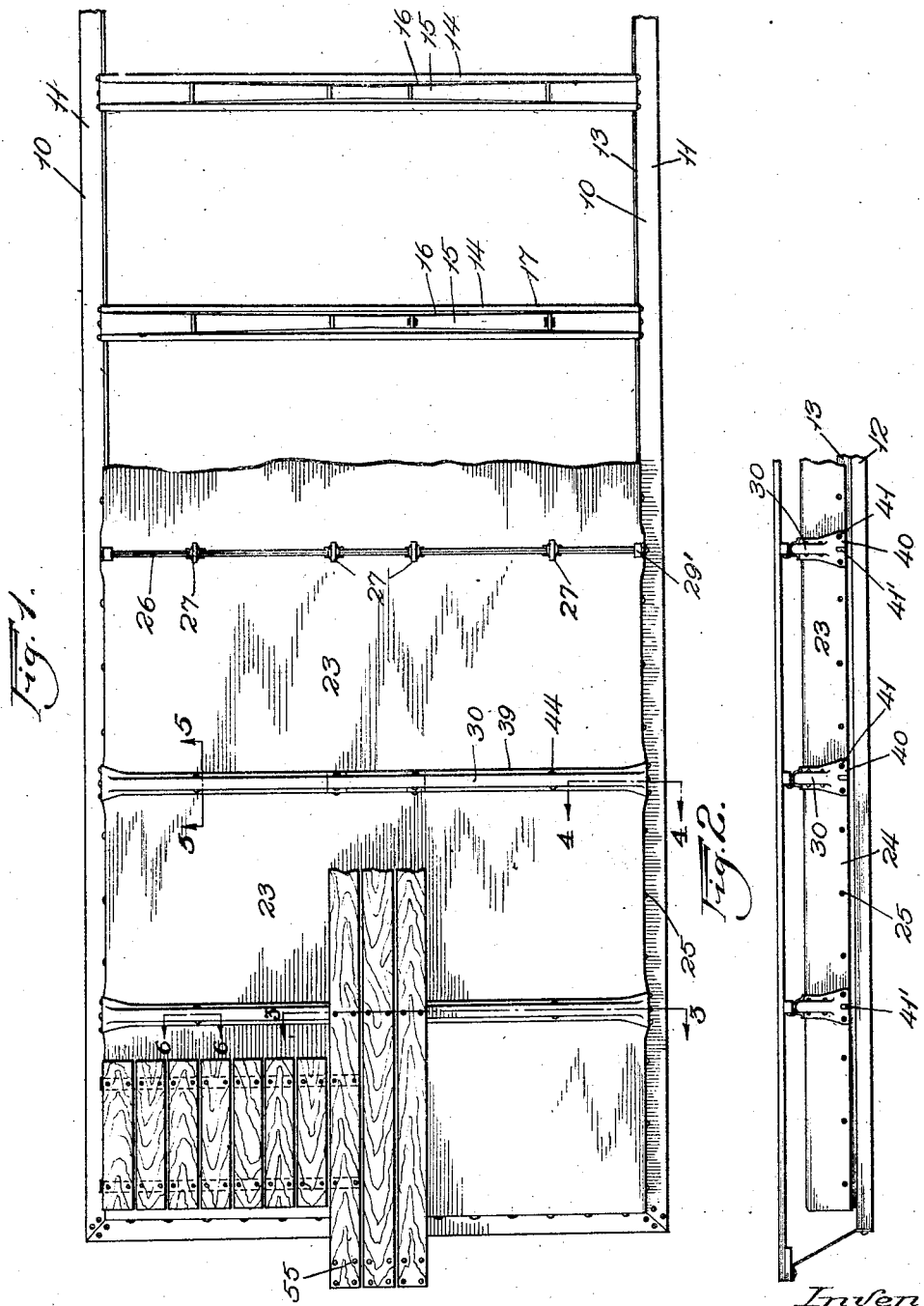
Inventor:
William Wright
By Munday Clarke & Carpenter Attys.

April 19, 1927.
W. WRIGHT
CAR ROOF
Filed April 26, 1924
1,625,636
5 Sheets-Sheet 2
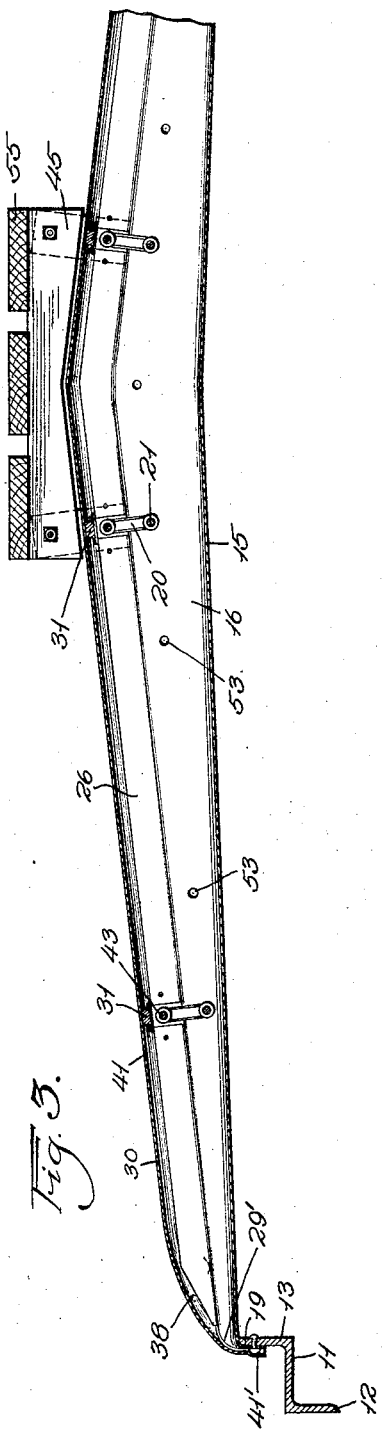
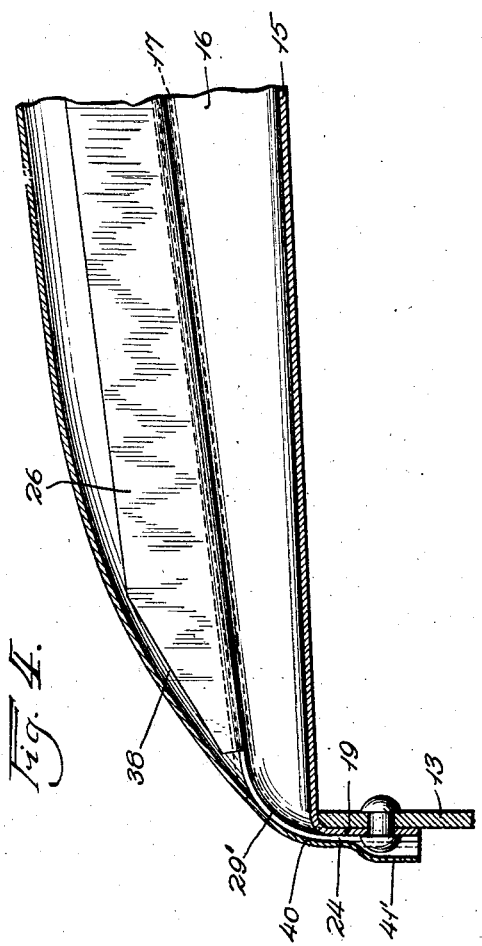
Inventor:
William Wright
By Munday Clarke & Carpenter Attys April 19, 1927.
W. WRIGHT
1,625,636
CAR ROOF
Filed April 26, 1924 5 Sheets-Sheet 3
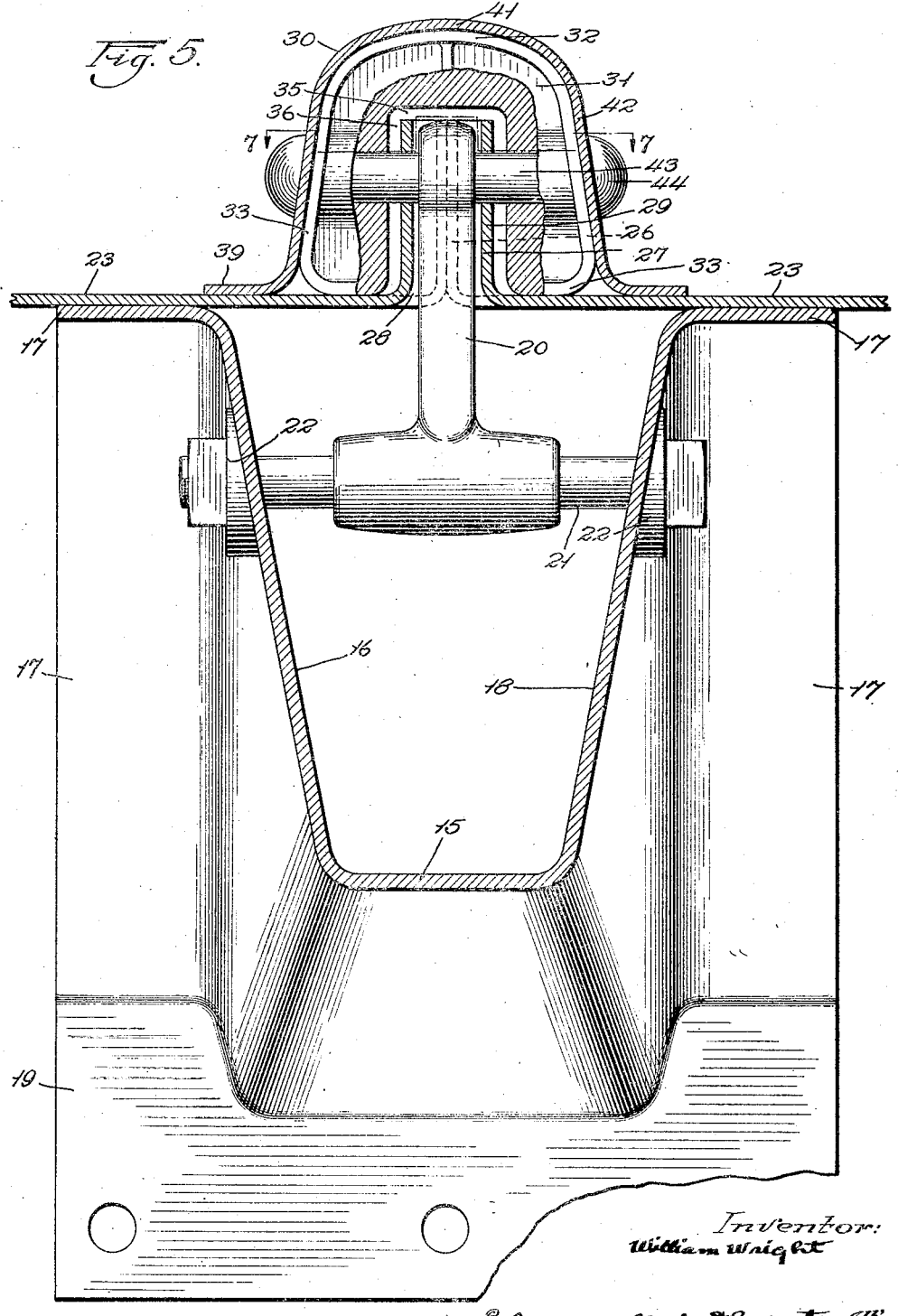

April 19, 1927.

W. WRIGHT

CAR ROOF

Filed April 26, 1924

Inventor:
William Wright

By Munday Clark & Carpenter Atty's.

April 19, 1927.
W. WRIGHT
CAR ROOF
Filed April 26, 1924
1,625,636
5 Sheets-Sheet 5
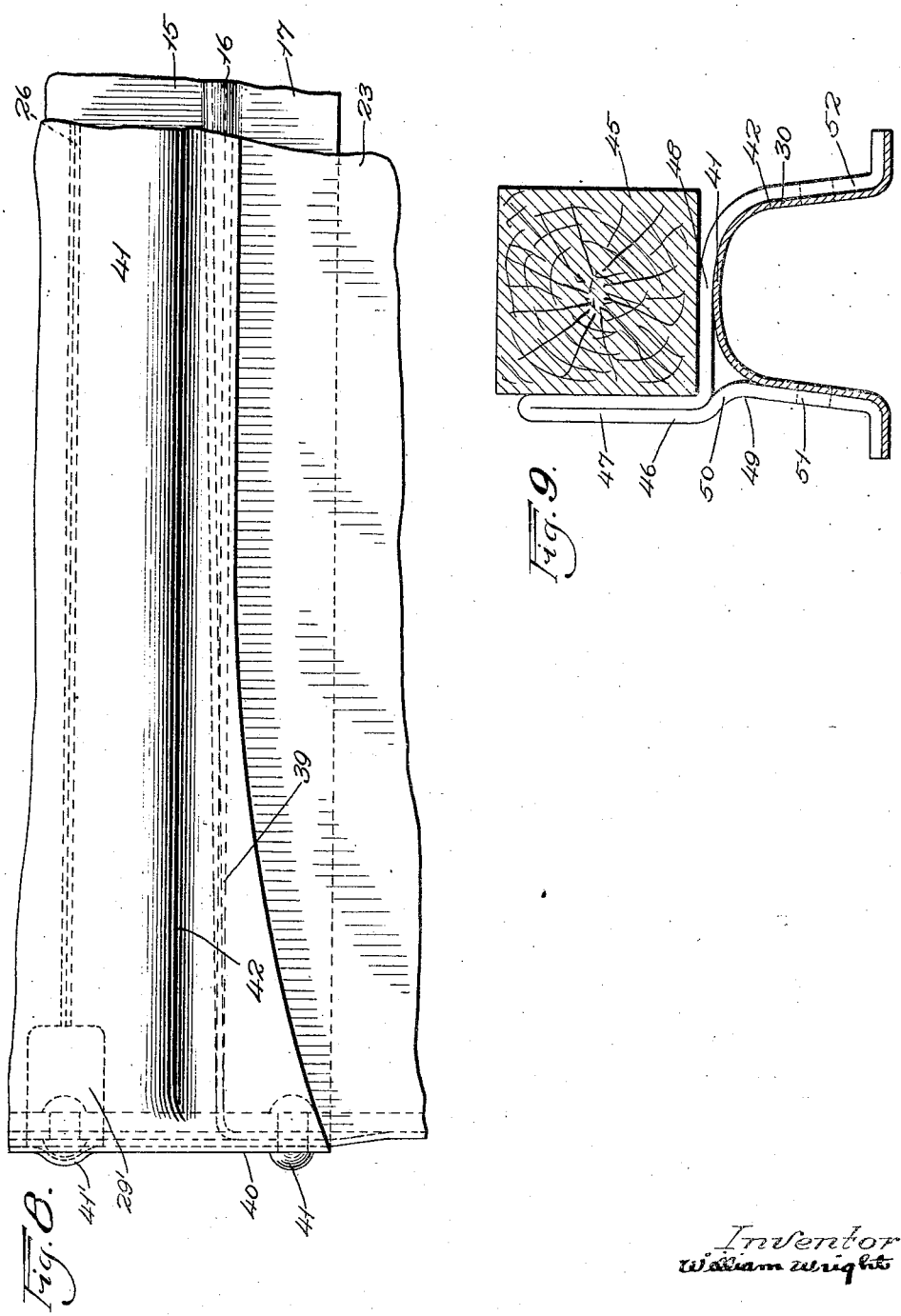

Patented Apr. 19, 1927.

1,625,636

UNITED STATES PATENT OFFICE.

WILLIAM WRIGHT, OF CHICAGO, ILLINOIS, ASSIGNOR, BY MESNE ASSIGNMENTS, TO CHICAGO-CLEVELAND CAR ROOFING COMPANY, OF CHICAGO, ILLINOIS, A CORPORATION OF DELAWARE.

CAR ROOF.

Application filed April 26, 1924. Serial No. 709,245.

This invention relates in general to freight car roofs and more particularly to improvements in construction of the all-steel type of such roofs. Objects of the invention are the provision of a car roof construction, the component parts of which are comparatively easy to manufacture at reasonable cost; the provision of a construction in which the roof sheets are held down on the car framing by relatively few parts, which parts are enclosed by a seam cap held in place without excessive strain which might cause leakages; the provision of a construction which will be exceedingly strong and durable and have upstanding side seams insuring against ingress of water, the provision of a construction which may be subject to ventilation, and such other objects and advantages of the invention as may be found to obtain in the structure hereinafter set forth and claimed.

In the accompanying drawings forming a part of this specification, and showing, for purposes of exemplification, a preferred form and manner in which the invention may be embodied and practiced, but without limiting the claimed invention specifically to such illustrative instance or instances:

Figure 1 is a top plan view of a portion of a car roof embodying the invention, parts being broken away for better illustration.

Fig. 2 is a side elevational view of a portion of Fig. 1.

Fig. 3 is a vertical sectional view taken substantially on the line 3—3 of Fig. 1.

Fig. 4 is a detailed vertical sectional view taken on the line 4—4 of Fig. 1.

Fig. 5 is a detailed vertical cross-section taken substantially on the line 5—5 of Fig. 1.

Fig. 8 is a top plan view of a part of a seam cap at the eaves of the roof.

Fig. 9 is a vetrical cross-section showing a manner of securing the running board saddle on the roof.

Figure 6:
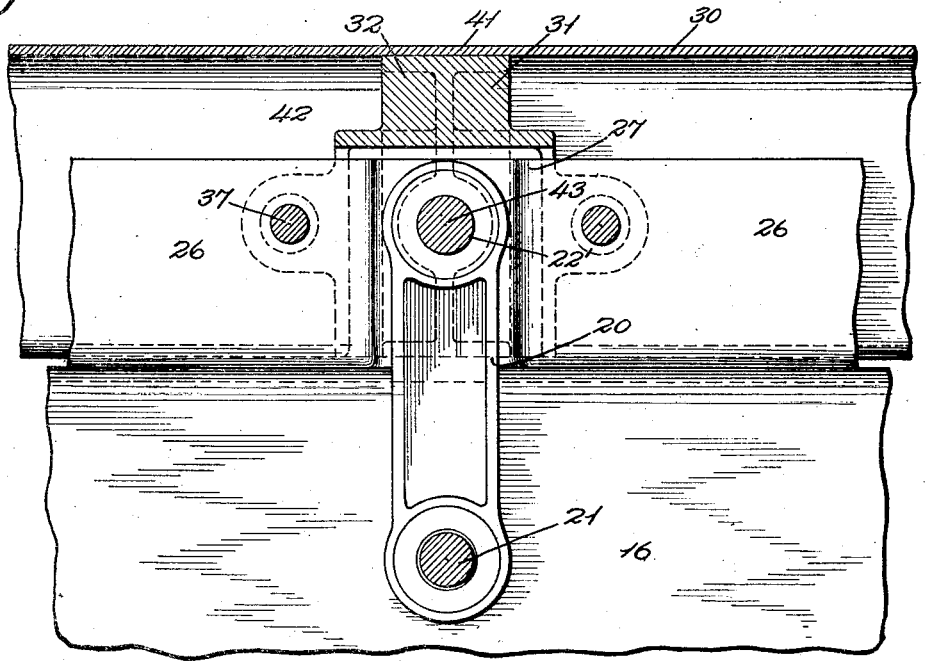
Fig. 6 is a detailed vertical cross-section taken substantially on the line 6—6 of Fig. 1.
Figure 7:
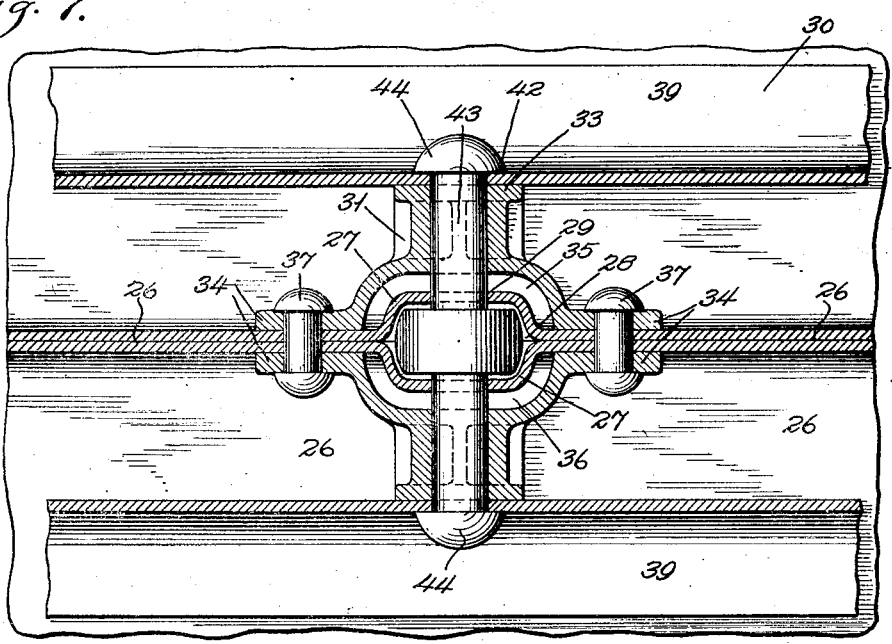
Fig. 7 is a detailed horizontal sectional view taken substantially on the line 7—7 of Fig. 5.

Referring to the drawings, 10 indicates the metallic side plates that extend longitudinally of the car, and are of the Z-bar type having a horizontal web 11, a depending flange 12 and an upper vertically extending flange 13. The side plates are spaced apart laterally and are connected by carlines 14 having a web 15 and upwardly directed outwardly diverging sides 16 that terminate in laterally extending flanges 17. The sides 16 and web 15 define a channel or trough 18, the web 15 increasing in width towards the side plates 10 as the diverging sides 16 decrease in depth and the upper ends of the diverging sides 16 being substantially equidistant throughout the length of the channel.

At each end the carline terminates in a depending flange 19 riveted to the vertical flange 13 of the side plates. Upright members or links 20 are positioned in the channels 18 and are secured therein by bolts 21 passing through to the sides 16 of the carlines at 22. At its upper end the link 20 is apertured to provide an eye 22' for the reception of a bolt 43. Metallic roof sheets 23 extend across the car from side plate to side plate and terminate there in depending flanges 24 riveted at 25 to the side plates. The sides of said roof sheets rest upon the lateral flanges 17 of the carlines 14 and said sides terminate in upwardly directed flanges 26 extending over the channel or trough of the carline longitudinally thereof. The adjacent flanges 26 of adjacent roof sheet sections 23 are in metal to metal contact but at certain spaced intervals the sides of the sheets and their flanges 26 are offset as at 27 to provide openings 28 into which the upper ends of the links 20 extend, the offset portions of the flanges 26 being provided with apertures 29 that register with the aperture or eye 22' of the link 20 enclosed in the space provided by said offset 27. At each eaves end the flanges 26 are coped at 29', as shown in dotted lines in Figure 8 to clear the rivet that secures the carline to the side plate and to provide a vent to the atmosphere for ventilation.

Saddles 31, cast as a unit, are provided over the offsets 27, said saddles having a top supporting surface portion 32 and depending roof sheet holding down portions 33 engaging the body of adjacent roof sheets opposite the offsets 27 and said saddles also having oppositely disposed pairs of extensions 34 that fit against the flanges 26 of the roof sheets and are spaced from each other by said flanges. The saddle is cast so as to leave a cavity 35 into which the offset 27 extends, said cavity being of such size as to leave a little space 36 between the saddle and the offset 27. The holding down portions of said saddles are provided with apertures that register with the apertures in the offset portions of the flanges 26 and the eye in the head of the link 20 therein. These saddles are spaced apart on the carline, in the present instance, one each on opposite sides of the ridge and one each between the side plates and the ridge saddle. The extensions 34 when arranged in place are riveted together and to the flanges 26 therebetween by rivets 37. At the eaves ends of the sheets the flanges 26 are cut away at 38 to allow the seam cap to fit down to the side plates. The seam caps 30 are of inverted channel shape. Their sides terminate in lateral flanges 39, and their eaves ends terminate in depending flanges 40 that are riveted to the side plates and the depending flanges of the roof sheet sections, by rivets 41, said flanges 40 being pressed out at 41' opposite the coping 29' to provide a vent.

The seam caps 30 are supported intermediate their eaves ends by the saddles 31, the top 41 of the seam cap resting on the supporting surfaces 32 of the subjacent saddles and the sides 42 resting against the sides of the holding down portions 33 of the saddles. The seam caps are rigidly supported on said saddles by bolts 43 that pass through the sides 42 of said seam caps 30 and through the apertures in the holding down portion 33 of the saddles, the apertures in the offsets 27 and the eye 22' in the link 20. These bolts 43 are riveted down on the outer surfaces of the sides of the seam caps as at 44. In order to support and hold the running board saddles 45, two holding members 46 are provided for each saddle, each of said holding members consisting of a single piece of metal bent upon itself at 47 to secure said member to said saddle and having a portion bent horizontally at 48 to support the saddle and also to rest upon the top of the seam cap 30 and the portion 48 then being bent downwardly at 52 against the side of the seam cap. The other portion 49 of said member is offset at 50 and then continues down at 51 against the other side of the seam cap. These portions 51 and 52 are secured in place by the bolt 43 that passes through the seam cap, inside saddle and offsets thereunder at the ridge.

From the foregoing it will be noted that the seam caps are securely supported by the saddles and that the saddles by reason of the bolt 43 and link 20 hold the roof sheets down on the lateral flanges of the carline and that the roof sheets are further rigidly secured in place by the riveting of the extensions of the saddle to the flanges 26 of the roofing sections and it will be further noted that the seam caps are not subjected to tearing strains such as would be caused if they acted as holding down means because the arrangement of the parts enables the saddles to function as supports for the seam caps and as holding down means for the roofing sections. In order to provide for ventilation the sides of the carlines are apertured as indicated at 53.

To assemble the roof above described, the carlines are first secured to the side plates and the links 20 then secured on the carlines. The roof sheets are then assembled over the carlines so that the respective offsets register and the upper ends of the links are enclosed by the corresponding offsets. Then the saddles are arranged over the offsets so that the apertures in the holding down portions and the apertures in the offsets 27 are in registration. Then the extensions 34 are connected by rivets 37 to the flanges 26 of the roof sheets. Then the seam caps 30 are arranged over the saddles to cover adjacent sides of adjacent roofing sections and the bolts 43 are then passed through the registering apertures in the seam cap, holding down portions of the saddle, the apertures in the offsets 27 and the eye 22' in the link 20. After the bolt 43 is inserted each end is riveted down on the sides of the seams and the eaves flanges of the roof sheets and seam cap are then riveted to the side plates. At the ridge the running board saddle supporting members are applied before the bolts 43 are passed through the aperture and the bolt is then riveted down on the portions 51 and 52 thereof.

Running boards 55 secured to the wooden running board saddles extend longitudinally of the roof as usual.

The invention as hereinabove set forth is embodied in a particular form of construction but may be variously embodied within the scope of the claims hereinafter made.

I claim:

1. A car roof comprising, in combination: side plates; channeled carlines extending from side plate to side plate, roof sheets having side flanges extending upwardly over the channels provided by said carlines, said flanges of adjacent roof sheets being disposed alongside each other when secured in place, and portions of adjacent roof sheets and their flanges being offset to provide openings; links extending through said openings, bolts connecting the lower ends of said links to the sides of said carlines; saddles arranged over the offset portions of said roof sheets but spaced therefrom, said saddles having extensions registering with each other at each side of the offsets of said roof sheets and spaced from each other by the side flanges of the roof sheet flanges therebetween, said extensions and the roof sheet flanges therebetween being riveted together, said saddles having a top portion and having side portions extending transversely with respect to the side flanges of the roof sheets, the lower ends of said side portions resting on the main body of the roof sheets at each side of said offsets, said seam caps enclosing the side edges of adjacent roof sheets, said seam caps having a top web and depending sides terminating in lateral flanges resting on the main body of the roof sheets, said seam caps being supported intermediate their ends by said saddles, and bolts extending into the sides of said seam caps, the side portions of said sadles, the offsets of said roof sheets and the upper end of the link extending in said offsets, said bolts being riveted to said seam caps.

2. A car roof comprising, in combination with the side plates: channel shaped carlines extending across the car from side plate to side plate and rigidly secured thereon, said carlines having a bottom web and upwardly directed sides, said sides terminating in lateral flanges; roof sheets extending across the car from side plate to side plate and rigidly secured thereon, said sheets being supported at their sides by the lateral flanges of said carlines, the sides of said roof sheets terminating in lateral flanges and the flanges of adjacent roof sheets being arranged close to each other over the channel of the carline beneath, portions of said roof sheets and their flanges being offset to provide openings, links extending into said openings and secured at their lower ends to said carlines, saddles arranged over said offsets, said saddles having a top portion and side portions resting on the main body of the adjacent roof sheets, said saddles having extensions at each end, said extensions being arranged alongside of and spaced from each other by the flanges of adjacent roof sheets, said extensions and the roof sheet flanges therebetween being riveted together, seam caps enclosing said saddles and the side edges of adjacent roof sheets, said seam caps being supported by said saddles and secured thereto by bolts riveted to said seam caps and extending therethrough and through the saddle, the offset portions of the roof sheets and the link between said offset portion.

3. A car roof comprising, in combination with the side plates: channeled carlines extending across the car from side plate to side plate and rigidly secured thereon, said carlines having lateral flanges at their upper portions, roof sheets extending between said side plates and supported at their sides by the flanges of said carlines, the sides of said roof sheets terminating in lateral flanges, a plurality of saddles positioned over said flanges of said roof sheets and rigidly secured thereto, said saddles being held down on said roof sheets by means secured to the carlines therebeneath and seam caps secured on said structure to enclose the side flanges of adjacent sheets.

4. A car roof comprising, in combination with the side plates; channeled carlines extending across the car from side plate to side plate and secured thereon, roof sheets disposed in the space defined by the side plates and the carlines, said roof sheets having flanges along their side edges and being supported at their sides by the carlines, means engaging the body portions of adjacent roof sheets to hold said roof sheets down on the carlines, said means being secured to the carlines and having portions between which adjacent flanges of the roof sheets extend, and seam caps enclosing the side edges of adjacent roof sheets.

5. In a car roof construction, the combination with the two laterally spaced side plates, and a channelled carline bridging the space between and connected to the side plates, of two roofing sections extending from over said carline laterally of the carline in opposite directions and also extending longitudinally of the carline and over the side plates and having downwardly projecting end portions at said side plates, each roofing section having an upwardly projecting side portion arranged over and longitudinally of said carline, means secured to said carline for holding said side portions of the roof sheets down on said carline, said carline having ventilating apertures therein, and a seam cap covering and extending longitudinally of the side portions of adjacent roof sheets and having downwardly projecting end portions arranged at the outer sides of the downwardly projecting end portions of said roofing sections, the top and sides of said cap being spaced from said upwardly projecting portions of the roof sections to form an interior air conducting passageway which communicates with the external atmosphere at the outer sides of the downwardly projecting end portions of said roofing sections and with the spaces below the longitudinally extending side edges of said roofing sections.

6. In a car roof construction, the combination with two laterally spaced side plates; a carline extending between and connected to the side plates; two metal roofing sections extending over said carline and laterally of the carline in opposite directions and also extending longitudinally of the carline and over the side plates and having downwardly projecting end portions at the side plates; each roofing section having an upwardly projecting side portion arranged over and longitudinally of the carline; means rigidly holding the sides of said roofing sections down on said carlines; and a metal cap spaced from and covering and extending longitudinally of the upwardly projecting side portions of said roofing sections; said cap at the outer side of each side plate having a downwardly projecting end portion arranged at the outer side of the adjacent downwardly projecting end portions of said roofing sections, there being an air conducting passageway formed between the inner side of each downwardly projecting end portion of said cap and the downwardly projecting end portions of adjacent roofing sections, said passageway communicating with the external atmosphere at the outer side of the side plates and being in communication with the spaces beneath said metal cap.

7. In a car roof construction, a suitably supported carline comprising a trough; two metal roofing sections extending over and longitudinally of said trough and laterally of said trough in opposite directions and having upwardly projecting side members extending above and longitudinally of said trough and making contact with each other over said trough, means secured to said carline for holding said roof sheets down on said carline, and a cap for weatherproofing the sides of adjacent roofing sections, said means being recessed to receive said upwardly projecting members, and said cap being spaced from said upwardly projecting members.

8. In a car roof construction, a suitably supported carline comprising a trough; two metal roofing sections extending over and longitudinally of said trough and laterally of said trough in opposite directions and having upwardly projecting side members extending above and longitudinally of said trough and making contact with each other over said trough; a saddle secured to the sides of said roofing sections, said saddle holding said roof sheets down on said carline by means secured to said carline and a cap weatherproofing the sides of said roofing sections and supported by said saddles.

9. In a car roof construction, the combination with the car roof frame, and two roofing sections arranged on and extending transversely of said frame, of an upright member attached to the car roof frame, means associated with said member for holding said roofing sections down on said roof frame; and a metal cap arranged over and covering adjacent portions of said roofing sections, said roofing sections being secured to each other and to said means beneath said cap.

10. In a car roof construction, the combination with a suitably supported carline comprising a trough, and two metal roofing sections extending over and longitudinally of said trough and laterally of the trough in opposite directions, of an upright member arranged between the ends of and attached to the carline, said member being provided with a saddle secured to said roofing sections, and a metal cap covering adjacent portions of said roofing sections and extending longitudinally of the carline, said cap being supported by said saddle.

11. In a car roof construction, the combination with the car roof frame and two metal roofing sections arranged over and extending transversely of said frame and having upwardly projecting side members contacting each other, a plurality of upwardly extending members attached to said frame arranged between and embraced by said side members, saddles respectively associated with said upwardly extending members and resting on the adjacent roofing sections, and a cap covering said upwardly extending members and said saddles and the side members of said roofing sections, said saddles being connected to said roofing sections through said upwardly projecting side members.

12. In combination with the side plates of a railway car, suitably supported carlines having a bottom web and upwardly extending outwardly diverging sides terminating in lateral flanges, said bottom web increasing in width as the sides decrease in depth towards the side plates, upwardly extending members secured to said carline, roof sheets supported at their sides by the lateral flanges of said carlines, said roof sheets terminating in lateral flanges, the lateral flanges of adjacent roof sheets being disposed opposite each other over the channel of the carline and confining the upwardly extending members that are secured to said carline, roof sheet holding members, secured to adjacent roof sheets and secured to said upright members and seam caps enclosing the adjacent side edges of adjacent roof sheets and also enclosing the roof sheet holding members, said seam caps being supported by said roof sheet holding members.

13. A car roof member comprising a seam cap supporting surface, a plurality of depending portions adapted to engage and hold down adjacent roof sheets and a plurality of members providing a space into which portions of adjacent roof sheets may be received and secured, said car roof member having a central chamber to receive an upwardly directed member for connecting said roof member to the framing of a car, said depending portion having registering apertures for the reception of a bolt.

14. A casting for car roofs comprising a seam cap supporting surface, a plurality of spaced roof sheet-engaging and holding down portions and a plurality of spaced extensions, said casting having a central orifice, and said roof sheet engaging portions and said spaced extensions forming walls defining a channel which is of increased width between its ends.

In testimony whereof I have hereunto set my hand.

WILLIAM WRIGHT.